United States Patent
Brookman et al.

[15] 3,661,618
[45] May 9, 1972

[54] PROCESS FOR THE PREPARATION OF PRESSURE SENSITIVE ADHESIVES

[72] Inventors: Robert S. Brookman; Stephen Grib, both of Pottstown, Pa.; Dale S. Pearson, Hauppauge, N.Y.

[73] Assignee: The Firestone Fire and Rubber Co., Akron, Ohio

[22] Filed: June 30, 1969

[21] Appl. No.: 837,878

[52] U.S. Cl. ........................... 117/62, 117/93.31, 117/122 P, 117/122 PF
[51] Int. Cl. ........................................................ C09j 7/02
[58] Field of Search ............. 117/62, 122 PA, 122 PF, 122 P, 117/93.31

[56] References Cited

UNITED STATES PATENTS

| | | | |
|---|---|---|---|
| 2,047,880 | 7/1936 | Morse | 117/122 X |
| 2,956,904 | 10/1960 | Hendricks | 117/62 X |
| 3,328,194 | 6/1967 | Kasper | 117/62 |
| 3,492,260 | 1/1970 | Samour et al. | 117/122 X |

OTHER PUBLICATIONS

Film Lamination by Radiation-Induced Polymerization of Acrylic Acid, Journal of Applied Polymer Science, Vol. 9, (1965) Marans et al., pp. 3661 to 3671 and pp. 3678 to 3679.

*Primary Examiner*—William D. Martin
*Assistant Examiner*—Bernard D. Pianalto
*Attorney*—Cooper, Dunham, Henninger & Clark

[57] ABSTRACT

Pressure sensitive adhesives are prepared from a monomer layer composition containing a liquid alkyl acrylate having an adjusted viscosity of about 100 centipoises or higher and optionally containing cross-linking monomers, by subjecting the monomer layer to high energy particle radiation in the essential absence of oxygen.

7 Claims, No Drawings

PROCESS FOR THE PREPARATION OF PRESSURE SENSITIVE ADHESIVES

This invention relates to the production of pressure sensitive adhesive materials, unitary pressure sensitive adhesive tapes, sheets and other structures and compositions used in preparing the same. More particularly, it related to a high energy irradiation process for preparing pressure sensitive adhesive layers on suitable substrates.

The use of pressure sensitive adhesives has recently become quite widespread. Justification for this no doubt lies in the convenience with which various tapes, tiles, sheets and other materials and structures can be utilized and the various effects that can be achieved not only from a structural, but also from a decorative and aesthetic standpoint. In general, such structures are prepared by coating a suitable backing material such as paper, plastic, glass, wood, foam and the like with a composition which can be rendered tacky by some chemical or physical means. Normally the composition applied to the backing comprises large amounts of solvents of one kind or another which must subsequently be removed when the composition has been rendered suitable for use. A typical procedure is to dissolve a suitable polymer in an appropriate solvent together with additives such as tackifiers and the like, apply the solution to a suitable substrate to a predetermined coating thickness, and then remove the solvent by evaporation. The resulting layer is a tacky, pressure sensitive composition useful in a variety of applications. This method is both quite expensive and potentially hazardous because solvent removal and recovery is a time-consuming, expensive operation and the solvents employed are usually toxic and/or explosive. Additionally, the presence of solvents cannot be tolerated even initially in some applications. For example, where absorbent backing materials such as paper, wood, fibers and the like are used, solvent bleed-through presents difficulties not easily tolerated or eliminated. Again, some backing materials are susceptible to attack by the solvent used for the system. For these reasons the solvent system approach is deficient as a universally applicable means of preparing pressure sensitive adhesives.

In general, a suitable commercial adhesive composition must possess the proper balance of adhesive and cohesive properties so that "adhesive transfer" (the tendency of the composition to adhere preferentially to the applied surfaces rather than to the backing material) is minimized. In tape applications this condition would prevent winding the tape upon itself unless certain precautions were taken. Similar difficulties would present themselves in other applications. On the other hand, the composition should also possess sufficient cohesiveness independent of its adhesive properties so that once applied, good, strong, integrated units are obtained. This balance between adhesiveness and cohesiveness is usually quite difficult to obtain, and the art has applied various techniques to this end.

At least one of these attempts has involved altering the polymeric structure of the adhesive. U.S. Pat. No. 2,956,904 describes a process for increasing the internal strength of a pressure sensitive adhesive, which is normally required for a strong bond without adversely affecting adhesive properties. To achieve this result the Patentee applies a solution of a polymer or mixtures of polymers on to a suitable substrate and then irradiates the polymer with high energy electron irradiation so as to induce cross-linking between the polymers. The result of this allegedly is to improve the cohesive bonding nature over and above that which would be obtained from the polymer system itself.

Unfortunately, the Patentee's system requires quite complex polymeric starting materials and large amounts of solvents. It therefore is not entirely satisfactory in providing a broad base means for producing an adhesive.

Attempts have been made at utilizing irradiation techniques for preparing bonding layers from monomeric materials but as far as is known, these techniques were not applicable in producing pressure sensitive adhesives. For example, in *Journal of Applied Polymer Science*, Vol. 9 pp. 3661–3680 (1965) in an article entitled "Film Lamination by Radiation-induced Polymerization of Acrylic Acid" the authors report the bonding of polymeric films by irradiation of a monomeric acrylic acid layer between the two films. Acrylic acid was the only monomer used which gave the desired results. On the basis of such work, the art has well concluded that irradiation techniques would not be a widely suitable means for producing adhesives at all let alone pressure sensitive adhesives.

In accordance with the present invention, however, it has now been discovered that certain monomers can be converted into pressure sensitive adhesives by irradiating the monomer with high energy electron or particle radiation until a suitable tacky state is obtained. The manner of forming the tacky adhesive in the present invention does not require the use of heat or solvents and therefore eliminates a fundamental difficulty presented by the art. Moreover, there is no distortion or other damage to either the substrate or the adhesive composition and the need for expensive solvent removing equipment is eliminated.

In general, the process of the invention involves applying a composition having an adjusted viscosity of about 100 centipoises or higher at standard conditions and comprising an acrylate monomer, optionally a multi-functional monomer and optionally a free radical yielding agent, to a suitable backing material and then subjecting the resulting structure to high energy radiation, in the essential absence of contaminating oxygen. Preferably oxygen is excluded by applying a protective release layer to the composition (sometimes hereafter called monomer layer) prior to irradiation. The irradiation process is then conducted on the thus protected monomer layer. This permits the essentially complete polymerization of the monomer and the formation of a good adhesive material since the presence of oxygen would otherwise retard polymerization and result in an undesirable product. After irradiation the resulting structure can be rolled, stored, shipped, cut or otherwise treated as desired. The release layer can be peeled off when desired for use and the structure applied as intended.

The present invention is based on the discovery that certain monomers in the presence of other materials can be polymerized by high energy radiation to form a tacky adhesive body. The monomers found to be particularly useful are liquid alkyl acrylates having the formula:

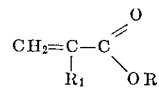

wherein R is an alkyl radical and $R_1$ is hydrogen or methyl. R suitably contains from one to 20 carbon atoms and may be straight or branched chain. Typical of such radicals are methyl, ethyl, propyl, butyl, hexyl, 2-ethyl hexyl, isobutyl, octyl, decyl, isodecyl, dodecyl and octadecyl. Best results are obtained with the longer carbon chain radicals and most preferred are those wherein R is the 2-ethyl hexyl radical, namely 2-ethyl hexyl acrylate or 2-ethyl hexyl methacrylate. Whatever else is present in the monomer layer, as described hereinafter, it is desirable that said layer as applied contain at least about 50 percent and preferably between 64 and 99 percent by weight of the acrylate monomer based on the entire weight of the layer. That such materials can be converted to a pressure sensitive state by irradiation is indeed surprising in view of previous work indicating this type of process to be unsuitable.

As stated above, the monomer layer has an adjusted viscosity of at least about 100 centipoises and preferably 200 to 500 centipoises measured at standard conditions. Since the acrylates used in the process of the invention are liquids of varying low viscosity, it is necessary to adjust the viscosity of the monomer layer to the desired level through the addition of a viscosity regulator. The amount of regulator added will depend to a large extent on the regulator itself, the particular acrylate monomer used, and the presence of other ingredients in the monomer layer formulation. Suitable results however are in general obtained at regulator levels of from one to 50 and preferably from two to 25 parts per hundred parts of acrylate monomer.

As regards the regulator itself, it is preferred that one be used which does not materially diminish tack formation of the acrylate monomer. Virtually any material capable of increasing viscosity can be employed provided the amounts required are not unreasonable. Best results are obtained with organic polymers such as cellulose derivatives, polyolefins, polyesters and copolymers of olefins, ethylenically unsaturated esters and the like. Typical materials are methyl cellulose, ethyl hydroxyethyl cellulose, cellulose acetate, polybutadiene, polychlorobutadiene, poly (vinyl acetate) and copolymers such as poly(vinyl acetate *co* 2-ethyl hexyl acrylate), poly(vinyl chloride *co* vinyl acetate) and poly(ethylene *co* vinyl acetate).

In addition to the regulator when employed, there may also be provided other materials to aid in the development and enhancement of the physical properties of the adhesive composition as manifested during use. These materials can be regarded as falling within two groups, one group constituting those materials which increase the adhesive properties and the other group comprising materials which increase the cohesive properties of the system. With regard to the former, most of the pressure sensitive adhesives produced according to the present invention will have excellent adhesion to vinyl-based substrates. It is also desirable in industry, however, to provide a wide-utility, all-purpose adhesive. Such materials will generally not be limited to simply vinyl-based substrates but should also be applicable to various other substrated such as substrates wood, cloth and the like. Moreover, since various materials will be encountered in use, irrespective of the substrate, the composition must be capable of widespread applicability. To that end then, a tackifier may be provided in the mixture to ensure that an adhesive tape or article will be obtained which will not only adhere very well to a vinyl backing strip or other vinyl surfaces but will also adhere very well to other substrates. Some added benefit can be obtained where the tackifier is one which can be cross-linked with the acrylate monomer thereby tending to increase the cohesive properties as well. As tackifiers there may be used any material commercially available for such purposes, notable among which are polyvinyl methyl ether, poly(vinyl butyl ether), poly(vinyl acetate), and natural or synthetic rosins and their derivatives. Best results are obtained when the tackifier is used in concentrations ranging from 15 to 35 parts per hundred parts of monomer and preferably 20 to 30 parts per hundred parts of monomer.

As regards the cohesive strength of the adhesive, it is most preferred to include within the system an agent which aids in achieving higher internal strength. Materials which are capable of performing in this manner are those which, because of their functionality, cross-link the polymer during the course of the irradiation reaction. While virtually any monomer which copolymerizes with the basic monomer of the composition may be employed, it is preferred to use multi-functional monomers such as esterified polyhydroxyl materials and especially those having six carbon atoms or less and at least two hydroxyl groups. Lower alkyl and alkenyl esters of ethylene glycol, diethylene glycol, trimethylolpropane, pentaerythritol, hexitols and the like are suitable. Especially useful are diethylene glycol diacrylate, trimethylolpropane triacrylate, trimethylolpropane trimethacrylate, 1,4 butylene diacrylate and the like. Good results are obtained when the multi-functional material is supplied at a level of 0.01 to 10 and preferably 0.1 to 1.0 parts per hundred parts of acrylate monomer.

It is sometimes desirable in carrying out the process of the invention that there be provided in admixture with the monomer a free radical yielding agent capable of capturing the irradiation and transferring the energy to a lower state in an efficient manner. The presence of such an agent often improves the rate of polymerization such that a suitable tacky polymer is obtained within a relatively short period. Suitable agents are those which have a high free radical yield, a sensitizing effect on solutions of acrylates and a high transfer constant in chain radical reactions. Particularly suitable for use in the present invention are the halogenated aliphatic hydrocarbons, preferably the chlorinated saturated lower alkanes having three or less carbon atoms, such as methylene chloride, chloroform, carbon tetrachloride, 1,2-di-chloroethane, 1,1-dichloroethane, and the like. Most preferred for use are chloroform and carbon tetrachloride. The effect of the halogenated hydrocarbon is best produced at levels ranging from 0.01 to 5.0 and preferably 0.1 to 1 parts per hundred parts of the monomer.

In carrying out the process of the invention, the selected materials, that is the acrylate, the regulator and other ingredients as desired, are intimately blended and applied to a suitable backing substrate. Initially, it is preferred to blend the regulator in after the other ingredients, when used, to take into account any effect that these other ingredients may have on viscosity. The substrate can be virtually any material such as paper, wood, glass, tile, film, polyurethanes, polyesters, vinyl-based polymers such as polyvinyl chloride, polyvinylidene chloride and the like. A predetermined thickness of the material, usually a thin film, is laid down as by roller coating, knife coating or some other suitable method. Ordinarily, thicknesses ranging from 0.1 to 10 mils will be suitable both from a subsequent irradiation process standpoint and from a commercial standpoint as well. Once applied, the coated substrate is then subjected to a high energy particle irradiation in the essential absence of oxygen. This may be achieved in any suitable manner such as by providing an inert ambient atmosphere in which the irradiation takes place or as stated above and as is preferred by applying a suitable release layer to the monomeric layer and the integrated unit then subjected to irradiation. The release layer is conveniently applied by conventional roller equipment. After the appropriate dose of radiation has been applied, the entire integrated unit can be shipped, stored, or otherwise used as desired. The release strip can be removed by the consumer or user prior to use. Any release material suitable in the adhesive art is likewise useable herein. Especially suitable are the silicone treated materials now in widespread use in general.

The pressure sensitive adhesive condition is achieved by subjecting the monomeric composition on the substrate to an adequate dose of high energy particle irradiation. This technique serves to polymerize the acrylate monomer and thereby achieve the desired objects. The radiation may be achieved by passing the monomeric structure through a beam of high energy electrons under conditions that will give a high energy dose rate of about 0.1 to 50 megarads/second for the layer thicknesses above described. Such a dose rate is effective to polymerize the monomer essentially completely and lead to a tacky condition displaying good adhesive and cohesive properties. A sufficient dose should be employed such as will result in an extent of polymerization as complete as possible. In general, dose rates of from 0.1 to 10 megarads per second and total doses of 2–10 megarads are suitable to achieve this result. Various dose rates can be achieved from conventional irradiation equipment by techniques known in the art.

For example, the desired amount of radiation can be obtained using a 300 Kev electron accelerator which emits a circular beam of electrons from a heated cathode filament. The electrons are guided through a scanning magnet and emerge through a titanium window approximately 1 × 24 inches. A beam power of 3 kw is obtained at an operating current at 10 mamps. For any given piece of equipment and irradiation sample location, the dosage delivered can be measured using the well-known blue cellophane technique. (See Henley, E.J.; Richman, D.; Anal. Chemical, 28 1580 (1956).) By altering beam diameter and distance to the source, various dose rates of radiation can be obtained.

After the monomer layer has received the predetermined amount of irradiation, the structure is then ready for packaging, storage or use as desired. Since the adhesive product obtained has strong bonding capacity and good cohesive properties, it is suitable for a wide variety of uses. It has good weathering characteristics and in the preferred aspect a low transfer rate. The following Examples are illustrative of specific embodiments of the invention:

EXAMPLES I – VIII

The following is a general procedure for preparing the adhesive of the present invention:

A 4 × 8 inch × 4 mil strip of plasticized polyvinyl chloride is coated with a 3 mil thickness of the composition described in the Table. The coating is then immediately covered with a 3 mil silicone-treated release paper and the entire composite then irradiated. The irradiation is accomplished by exposing the composite to an electron beam of a 300 Kev electron accelerator operated as 10 mamps by passing the composite through the beam at a point 6 inches below a 1 × 24 inch titanium beam window. The sample is passed at a rate sufficient to give the total dose listed in the Table. Under these conditions a speed of about 50 ft/min is used for dose rate of about 1 megarad/second. Thereafter, samples of the adhesive are tested for adhesive transfer by applying the adhesive to a polished steel plate, exposing the plate in a weatherometer to accelerate weathering conditions for the exposure time stated in the Table and thereafter removing the paper and checking for adhesive transfer to the plate. The results are summarized in the Table below. The weight percent of adhesive transferred to the steel plate (percent transfer) is shown.

The weatherometer test is the standard ASTM 3-42-65 and generally involves subjecting the test sample to periods of high and low humidity and to some extent to a direct water spray.

TABLE

| Example | System* | Dose | Exposure Time | % Transfer |
|---|---|---|---|---|
| I | 1 | 8 Mr. | 300 hrs. | 0 |
| II | 1 | 10 Mr. | 300 hrs. | 3 |
| III | 2 | 8 Mr. | 300 hrs. | 0 |
| IV | 2 | 10 Mr. | 300 hrs. | 4 |
| V | 3 | 8 Mr. | 300 hrs. | 5 |
| VI | 3 | 10 Mr. | 300 hrs. | 10 |
| VII | 4 | 8 Mr. | 200 hrs. | 25 |
| VIII | 4 | 10 Mr. | 200 hrs. | 25 |

*Systems
1. 79.75%-2-ethyl hexyl acrylate + 20% of a 50/50 mole percent copolymer of 2-ethyl hexyl acrylate and vinyl acetate + 0.25% trimethylolpropane triacrylate (TPT).
2. Same as System No. 1 except trimethylolpropane trimethacrylate is used in place of TPT.
3. Same as System No. 1 except diethylene glycol triacrylate is used in place of TPT.
4. 80%-2-ethyl hexyl acrylate + 20% of the copolymer used in System No. 1.

All of the above compositions produce acceptable adhesives with good, strong cohesive properties. Systems 1, 2 and 3, which contain a multi-functional monomer show minimum transfer, which is of benefit in applications involving re-use of the structure.

EXAMPLE IX

A 4 × 8 inch strip of 4 mil plasticized polyvinyl chloride is coated with an 80 percent solution of 2-ethyl hexyl acrylate containing 20 percent of a 50/50 copolymer of 2-ethyl hexyl acrylate and vinyl acetate having a molecular weight of about 2,000. The coating is applied with a No. 8 wire wound bar which gives a final thickness of 1 mil. This coating is then covered with a release paper and irradiated to 10 megarads as described previously. The release paper is removed and the adhesive strip applied to a smooth stainless steel plate and then exposed for 120 hours in a weatherometer. When the strip is removed only 5 percent of the adhesive is transferred to the plate.

BROADER EXAMPLES

Similar results are obtained when the foregoing procedures are repeated using equivalent amounts of 2-ethyl hexyl methacrylate, dodecyl acrylate or octadecyl acrylate in place of the 2-ethyl hexyl acrylate.

WHAT IS CLAIMED IS:

1. The process for preparing a pressure sensitive adhesive which comprises applying to a backing material a monomeric layer composition comprising a liquid acrylate of the formula

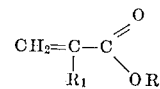

wherein R is alkyl and $R_1$ is hydrogen or methyl, said composition having an adjusted viscosity of at least about 100 centipoises, from 1 to 50 parts of an organic polymer viscosity regulator and from 0.01 to 10 parts of a multi-functional organic monomer capable of crosslinking with said liquid acrylate under radiation conditions, all parts based on 100 parts of liquid acrylate, and subjecting said composition to from 0.1 to 50 megarads of high energy particle radiation in the essential absence of oxygen.

2. The process of claim 1 wherein prior to subjecting the monomer layer to irradiation, a release layer is applied to said monomer layer therby essentially to exclude oxygen from the monomer layer.

3. The process of claim 1 wherein a free radical yielding agent is additionally present in said monomeric layer composition.

4. The process according to claim 1 wherein the acrylate is 2-ethyl hexyl acrylate.

5. The process of claim 1 wherein the viscosity regulator is a copolymer of 2-ethyl hexyl acrylate and vinyl acetate.

6. The process of claim 1 wherein said acrylate monomer constitutes at least 50 weight percent of the entire monomeric composition.

7. The process according to claim 1 wherein the multi-functional monomer is a lower alkyl or alkenyl ester of a hydroxy compound having from two to six carbon atoms and at least two hydroxyl groups and said viscosity regulator is a polyolefin, a polyester or an olefin-ethylenically unsaturated ester copolymer.

* * * * *